(12) United States Patent
Kim et al.

(10) Patent No.: US 10,343,490 B2
(45) Date of Patent: Jul. 9, 2019

(54) SAFETY DEVICE FOR VEHICLE

(71) Applicant: LG ELECTRONICS INC., Seoul (KR)

(72) Inventors: Bumsuk Kim, Seoul (KR); Kyunghwan Kim, Seoul (KR); Namsik Yim, Seoul (KR); Joohyung Kim, Seoul (KR); Junggu Lee, Seoul (KR); Junyoung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 15/425,658

(22) Filed: Feb. 6, 2017

(65) Prior Publication Data

US 2017/0291473 A1 Oct. 12, 2017

Related U.S. Application Data

(60) Provisional application No. 62/319,263, filed on Apr. 6, 2016.

(30) Foreign Application Priority Data

Jun. 23, 2016 (KR) .................. 10-2016-0078831

(51) Int. Cl.
*B60H 1/32* (2006.01)
*B60H 1/00* (2006.01)
(Continued)

(52) U.S. Cl.
CPC ....... *B60H 1/3217* (2013.01); *B60H 1/00485* (2013.01); *B60H 1/00978* (2013.01);
(Continued)

(58) Field of Classification Search
CPC .. B60H 1/00; B60H 1/00485; B60H 1/00978; B60H 1/32; B60H 1/3217; B60H 1/3223;
(Continued)

(56) References Cited

U.S. PATENT DOCUMENTS 2,649,311 A * 8/1953 Hetrick ................. B60R 21/268
 180/90
3,572,378 A * 3/1971 Hartwick .............. F04B 49/243
 137/484.2
(Continued)

FOREIGN PATENT DOCUMENTS

CN 2802126 Y * 8/2006
EP 1481827 A1 12/2004
(Continued)

OTHER PUBLICATIONS

And, Hydraulic Relief Valves, Jan. 12, 2011, Hydraulic Valve (Year: 2011).*

*Primary Examiner* — Edward F Landrum
*Assistant Examiner* — Chang H. Park
(74) *Attorney, Agent, or Firm* — Birch, Stewart, Kolasch & Birch, LLP

(57) ABSTRACT

A safety device for a vehicle can include an impulse sensor configured to sense an impact to the vehicle and generate an impulse signal based on the impact, a compressor configured to compress refrigerant for a refrigeration cycle of the vehicle, and a safety valve connected to the compressor and configured to receive the impulse signal from the impulse sensor, and in response to the impulse signal exceeding a predetermined value, open the safety valve to place an inner space of the compressor in communication with an outside of the compressor for discharging the refrigerant outside the vehicle.

20 Claims, 13 Drawing Sheets

(51) Int. Cl.
*F04B 49/03* (2006.01)
*F04D 27/02* (2006.01)
*F25B 49/00* (2006.01)

(52) U.S. Cl.
CPC ......... *B60H 1/3223* (2013.01); *B60H 1/3225* (2013.01); *F04B 49/03* (2013.01); *F04D 27/0292* (2013.01); *F25B 49/005* (2013.01); *B60H 2001/3266* (2013.01)

(58) Field of Classification Search
CPC .......... B60H 1/3225; B60H 2001/3266; F04B 49/03; F04D 27/02; F04D 27/0292; F16K 11/0785; F16K 15/025; F16K 15/03; F16K 15/12; F16K 17/04; F16K 17/0413; F16K 17/06; F16K 3/182; F16K 3/202; F16K 31/047; F16K 31/10; F16K 31/265; F16K 31/50; F16K 15/18; F16K 17/36; F25B 49/00; F25B 49/005
USPC ........................................ 137/38, 456, 529
See application file for complete search history.

(56) References Cited

U.S. PATENT DOCUMENTS

| | | | |
|---|---|---|---|
| 3,800,824 A * | 4/1974 | Medina | F16K 15/063 137/541 |
| 3,933,005 A | 1/1976 | Beltz | |
| 4,133,186 A | 1/1979 | Brucken et al. | |
| 6,019,115 A * | 2/2000 | Sanders | F16K 17/30 137/10 |
| 7,047,834 B2 * | 5/2006 | Nielsen | F16D 41/206 74/89.38 |
| 7,322,210 B2 * | 1/2008 | Furuta | B60H 1/00978 62/475 |
| 2006/0106538 A1 * | 5/2006 | Browne | B60R 21/01 701/301 |
| 2011/0190972 A1 * | 8/2011 | Timmons | G01C 21/34 701/31.4 |
| 2014/0149001 A1 * | 5/2014 | Kim | B60R 21/0136 701/46 |

FOREIGN PATENT DOCUMENTS

| | | | | |
|---|---|---|---|---|
| EP | 2520472 A2 | | 11/2012 | |
| JP | 02027410 A | * | 1/1990 | |
| JP | 6-71978 U | | 10/1994 | |
| JP | 2005-153773 A | | 6/2005 | |
| JP | 2015-68304 A | | 4/2015 | |
| JP | 2015068304 A | * | 4/2015 | |
| KR | 10-2007-0097908 A | | 10/2007 | |
| KR | 10-2008-0027692 A | | 3/2008 | |
| KR | 10-2011-0070191 A | | 6/2011 | |
| KR | 10-2011-0077520 A | | 7/2011 | |
| KR | 20110077520 A | * | 7/2011 | |
| WO | WO 9847109 A1 | * | 10/1998 | G07C 5/008 |

* cited by examiner

SAFETY DEVICE FOR VEHICLE

CROSS-REFERENCE TO RELATED APPLICATIONS

This application claims priority to U.S. Provisional Application No. 62/319,263, filed in the Republic of Korea on Apr. 6, 2016, and Korean Application No. 10-2016-0078831, filed on Jun. 23, 2016, the contents of all these applications are incorporated by reference in their entirety.

BACKGROUND OF THE INVENTION

1. Field of the Invention

The present disclosure relates to a safety device for a vehicle, and particularly, to a safety device for a vehicle for preventing refrigerant in a refrigeration cycle for a vehicle from being introduced into an interior of the vehicle.

2. Description of the Related Art

In general, an air conditioning apparatus for vehicle can include a compressor for compressing refrigerant that circulates a refrigeration cycle, a condenser for condensing the compressed refrigerant, a receiver/dryer for dividing the condensed refrigerant into gas and liquid while temporarily collecting refrigerant that circulates the refrigeration cycle, an expansion apparatus for throttle-expanding liquid refrigerant that has been divided into gas and liquid, and an evaporator for evaporating the expanded refrigerant to return to the compressor.

Alternative freon (HFC-134a) has been used as refrigerant in a refrigeration cycle in an air conditioning apparatus for vehicle, but in recent years, refrigerant having a small global warming coefficient has been required to suppress global warming. For such refrigerants, carbon dioxide ($CO_2$), HFC-152a, butane, propane, and the like are known, for example.

However, when such refrigerants are used for refrigerant in an air conditioning apparatus, in a situation where an evaporator installed in an interior of a vehicle or an interior pipe of a vehicle is damaged by a vehicle accident or the like, refrigerant can leak into the interior of the vehicle. In particular, when the refrigerant is carbon dioxide refrigerant, a vehicle occupant may suffocate due to lack of oxygen, and when the refrigerant is a flammable refrigerant such as HFC-152a or the like, it can cause serious risks such as an incidence of fire.

Accordingly, even when a crack occurs due to aging of the evaporator or other reasons or a constituent element in the refrigeration cycle undergoes serious damage due to a vehicle accident or the like, it may be required that refrigerant within the refrigeration cycle should not be introduced into the interior of the vehicle.

In the related art, technologies have been introduced, which include relief devices that are attached to a high pressure side and a low pressure side of the compressor, respectively, in an air conditioning apparatus for vehicle using flammable refrigerant, and the relief devices are operated to discharge flammable refrigerant within the refrigeration cycle to the outside of the vehicle when a collision accident occurs that causes an airbag to be deployed by an airbag control unit (ACU).

However, in the related art, the relief devices are dependent on a collision sensor, and therefore, there is a limit in quickly discharging leaked refrigerant to the outside of the vehicle.

Furthermore, the relief devices may be operated in a posteriori manner since a collision occurs, and thus there is a concern of introducing a small amount of refrigerant to an interior of the vehicle.

Furthermore, the relief devices may be unnecessarily operated even when refrigerant is not leaked in practice as they are operated without considering the leakage possibility of refrigerant, thereby increasing the maintenance cost of components due to exchanging the relief devices.

Furthermore, an excessive compression prevention valve for resolving excessive compression may be additionally provided when excessive compression occurs due to various reasons in an air conditioning apparatus for vehicle, thereby increasing the fabrication cost due to an increased number of components.

SUMMARY OF THE INVENTION

An aspect of the present disclosure is to provide a safety device for a vehicle capable of quickly discharging leaked refrigerant to an outside of the vehicle when harmful refrigerant such as carbon dioxide is used.

Another aspect of the present disclosure is to provide a safety device for a vehicle capable of predicting an refrigerant leakage type of environment in advance to discharge refrigerant in advance to an outside of the vehicle when harmful refrigerant such as carbon dioxide is used.

Still another aspect of the present disclosure is to provide a safety device for a vehicle capable of calculating the probability of refrigerant leakage to discharge refrigerant to an outside of the vehicle only when required when harmful refrigerant such as carbon dioxide is used.

Yet still another aspect of the present disclosure is to provide a safety device for a vehicle capable of being controlled by a control device to discharge refrigerant to an outside of the vehicle during a collision of the vehicle as well as being operated by a pressure with no additional control to discharge refrigerant during excessive compression.

Still yet another aspect of the present disclosure is to provide a safety device for a vehicle capable of implementing a switching operation in a stable and accurate manner.

In order to accomplish the objectives of the present disclosure, there is provided a compressor within a vehicle to constitute a refrigeration cycle and compress refrigerant; a safety device for the vehicle, including an impulse sensor provided in the vehicle to allow the vehicle to sense an impulse received from an outside; and a safety valve provided in the compressor to have a switching unit for selectively communicating an inner space of the compressor with an outside of the compressor, in which the switching unit is electrically connected to the impulse sensor to discharge refrigerant in the inner space of the compressor out of the compressor while the switching unit is opened when an impulse sensed by the impulse sensor exceeds a predetermined range.

Here, the safety valve can be electrically connected to an airbag control unit (ACU) or electronic control unit (ECU) to link a motor unit that receives electrical signals with the airbag control unit provided in the vehicle or the electronic control unit electrically connected to various sensors within the vehicle. Also, the electronic control unit can be provided with a determination unit configured to estimate and determine whether the vehicle collides based on signals transferred through the various sensors, and an output unit configured to control a heating, ventilation, and air conditioning (HVAC) unit provided within the vehicle according to the determination unit.

Furthermore, the motor unit of the safety valve can be directly connected to an output terminal of the airbag control unit or electronic control unit. Also, the motor unit of the safety valve can be electrically connected to an output terminal of a compressor controller configured to control the compressor, and an input terminal of the compressor controller can be electrically connected to an output terminal of the airbag control unit or electronic control unit.

Furthermore, the safety valve can be provided with a discharge port configured to discharge the refrigerant within the compressor to the outside of the compressor, and the outlet can be provided with a discharge guide pipe configured to guide the refrigerant of the compressor to an outside of the vehicle. Also, the safety valve can be configured to open a switching unit when an internal pressure of the compressor is above a predetermined pressure.

In addition, the safety valve can include a valve housing having an inlet and an outlet; a piston valve provided within the valve housing to selectively communicate between the inlet and the outlet; a valve spring provided at a backpressure side of the piston valve to limit the piston valve from being opened; a spacer inserted through the valve housing to adjust an elastic force of the valve spring; and a control unit provided at one side of the valve housing to operate the spacer. The control unit can include a motor unit configured to receive power from an outside to operate; and a connection portion coupled between the motor unit and the spacer to transfer a driving force of the motor unit to the spacer to move the spacer.

Furthermore, a valve guide configured to guide the movement of the piston valve can be further provided within the valve housing, and a guide portion into which a sliding portion of the piston valve is slidably inserted can be formed on the valve guide in a switching direction of the piston valve. Also, the control unit can include a motor unit configured to receive power from an outside to operate; a stopper provided in the motor unit to restrict or release the movement of the spacer while being moved by the motor unit; and a return spring configured to support the stopper, and move the stopper when the stopper is released from the spacer.

Furthermore, a valve guide configured to guide the movement of the piston valve can be further provided within the valve housing, and the valve guide can be slidably coupled to the spacer, and a surface, on which the valve guide and the spacer are brought into contact, can be formed in an inclined manner to move the spacer and the valve guide in an orthogonal direction.

In order to accomplish the objectives of the present disclosure, there is provided a safety device for vehicle, including a refrigeration cycle unit provided in a vehicle to heat or cool a passenger compartment of the vehicle; an electronic control unit (ECU) provided in the vehicle to control various functions of the vehicle; and a refrigerant discharge unit electrically connected to the electronic control unit to selectively discharge the refrigerant of the refrigeration cycle to an outside of the vehicle while being linked with the electronic control valve.

Here, the electronic control unit can be configured to calculate a shock or impact received by the vehicle, and provide an open signal to the refrigerant discharge unit or close an air path of the refrigeration cycle unit when the value is greater than or equal to a predetermined range. Furthermore, the electronic control unit is configured to estimate or detect an estimated time-to-collision and a braking time of the vehicle, and provide an open signal to the refrigerant discharge unit or close an air path of the refrigeration cycle unit based on the estimated time-to-collision and the braking time of the vehicle.

Also, the electronic control unit is configured to compare the estimated time-to-collision and the braking time of the vehicle, and provide an open signal to the refrigerant discharge unit or close an air path of the refrigeration cycle unit when the estimated time-to-collision of the vehicle is less than or equal to the braking time of the vehicle.

Furthermore, the electronic control unit is configured to estimate or detect a collision amount of the vehicle, and provide a close signal to the refrigerant discharge unit based on the collision amount of the vehicle. Here, the electronic control unit is configured to provide a close signal to the refrigerant discharge unit when the collision amount is less than or equal to a reference value.

In addition, the electronic control unit is configured to detect a tilt of the vehicle defined by the extent of vehicle being tilted with respect to a horizontal surface, and provide an open signal to the refrigerant discharge unit or close an air path of the refrigeration cycle unit based on the tilt of the vehicle. Here, the electronic control unit is configured to provide an open signal to the refrigerant discharge unit or close an air path of the refrigeration cycle unit using when the tilt of the vehicle is above 90 degrees.

Furthermore, the electronic control unit is configured to detect a fall speed of the vehicle, and provide an open signal to the refrigerant discharge unit or close an air path of the refrigeration cycle unit based on the fall speed of the vehicle. Here, the electronic control unit is configured to compare a fall speed with a freefall speed of the vehicle, and provide an open signal to the refrigerant discharge unit or close an air path of the refrigeration cycle unit when the fall speed of the vehicle is close to the freefall speed.

In addition, the electronic control unit is configured to detect a height variation rate during the driving of the vehicle, and provide an open signal to the refrigerant discharge unit or close an air path of the refrigeration cycle unit based on the height variation rate during the driving of the vehicle. Here, the electronic control unit is configured to provide an open signal to the refrigerant discharge unit or close an air path of the refrigeration cycle unit when a height variation rate during the driving of the vehicle exceeds or equal to (a statutory slope rate (sin) for each road×vehicle maximum speed). Also, the refrigerant discharge unit can be detachably provided on a compressor constituting the refrigeration cycle.

Furthermore, an inlet at one side of the refrigerant discharge unit can communicate with an inner space of the compressor, and an outlet formed at the other side of the refrigerant discharge unit can communicate toward an outside of the vehicle, and a valve configured to receive an electrical signal transferred from the electronic control unit and selectively switch between the inlet and outlet of the refrigerant discharge unit can be provided within the refrigerant discharge unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7A and 7B are longitudinal cross-sectional views illustrating the operations of a PRV according to FIG. 3, in which FIG. 7A is a view illustrating an operation when a collision occurs, and FIG. 7B is a view illustrating an operation when excessive compression occurs;

FIGS. 9A and 9B are longitudinal cross-sectional views illustrating the operations of a PRV according to FIG. 8, in which FIG. 9A is a view illustrating an operation when a collision occurs, and FIG. 9B is a view illustrating an operation when excessive compression occurs;

FIGS. 10 through 12 are block diagrams illustrating operation examples of a PRV according to embodiments, in which FIGS. 10 and 11 are views illustrating an operation example using a collision sensor, and FIG. 12 is an operation example using an advanced driver assistance system (ADAS)

DETAILED DESCRIPTION OF THE INVENTION

Hereinafter, a safety device for a vehicle according to the present disclosure will be described in detail based on embodiments illustrated in the accompanying drawings.

Figure 1:
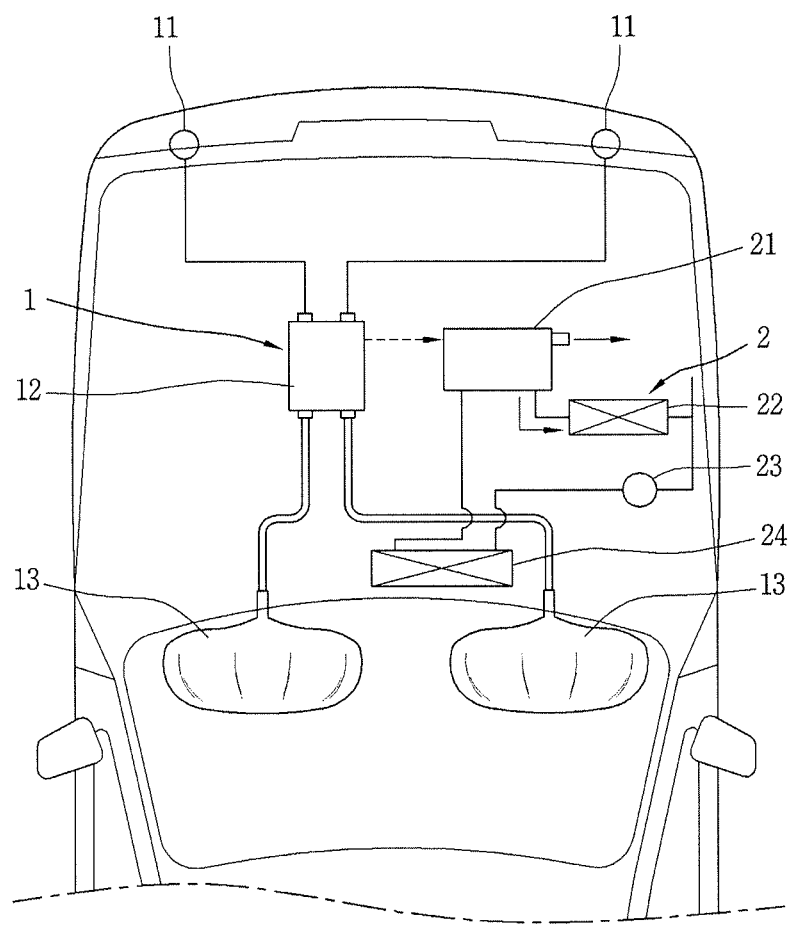
FIG. 1 is a schematic view illustrating a vehicle mounted with a safety device according to an embodiment.

FIG. 1 is a schematic view illustrating a vehicle mounted with a safety device according to the present disclosure. As illustrated herein, a safety device for a vehicle according to an embodiment can be electrically connected to an airbag system within the vehicle.

An airbag system 1 can include a collision sensor (front/side impact sensors 11) provided at a front side or lateral surface of the relevant vehicle to determine whether the vehicle collides, an airbag control unit (ACU) 12 configured to determine whether the airbag operates based on an impulse sensed from the collision sensor 11, an inflator configured to quickly generate gas when an airbag operation signal is generated, and a bag 13 configured to expand with the generated gas to substantially protect passengers. The foregoing airbag system 1 can sense a collision signal transmitted to the airbag control unit 12 by allowing collision sensors 11 mounted on a front side portion and a lateral structural portion of the vehicle to sense a collision and sense a collision signal sensed through a sensor integrated into the airbag control unit 12 to determine whether the airbag control unit 12 expands through comprehensive calculations and then perform actual expansion.

Furthermore, the time taken to perform the process is very short, approximately 0.02 seconds, and the status of power during expansion, an expanded time, whether or not a safety belt is used, and the like are recorded by the airbag control unit 12, and it is designed to allow airbag expansion for a predetermined period of time even when a battery is released due to a collision. However, in a circumstance during which an airbag is deployed, a refrigeration cycle device 2 provided within the vehicle may be damaged and introduce or leak refrigerant into the interior of the vehicle. Accordingly, a safety device for discharging refrigerant within the refrigeration cycle in advance when likely damage of the vehicle is expected in the middle of refrigeration cycle device 2 can be provided therein.

In particular, in a situation where the type of refrigerant used is harmful, such as $CO_2$ refrigerant, it is advantageous to discharge the refrigerant outside the vehicle, in advance, since the driver would be placed in danger if the refrigerant is introduced into the interior of the vehicle. Hereinafter, refrigerant including $CO_2$ refrigerant will be commonly referred to as refrigerant.

As illustrated in FIG. 1, the refrigeration cycle device 2 for a vehicle can include a compressor 21 for compressing refrigerant that circulates the refrigeration cycle, a condenser 22 for condensing the compressed refrigerant, and a receiver/drier for separating the condensed refrigerant into gas-liquid while temporarily collecting refrigerant that circulates the refrigeration cycle, an expansion apparatus 23 for throttle-expanding liquid refrigerant separated into gas-liquid, and an evaporator 24 for evaporating the expanded refrigerant to return to the compressor. Among them, the compressor 21, the condenser 22, the receiver/drier and the expansion apparatus 23 are provided at an outside or in the exterior area of the vehicle, and the evaporator 24 is provided to communicate the indoor or outdoor area. Accordingly, during a vehicle accident, some of the refrigerant could be introduced or leak into the interior of the vehicle by the evaporator 24 or an accessory, such as a refrigerant pipe or fan connected to the evaporator 24.

In consideration of this, a pressure relief valve (PRV) 100 (e.g., a safety valve) as a safety device can be provided in the compressor (or in the middle of the refrigerant pipe of the refrigeration cycle) 21 as illustrated in the present embodiment. The PRV 100 can be provided at either a low pressure portion or a high pressure portion of the compressor 21, but according to this example, it can be provided at the high pressure portion.

Figure 2:
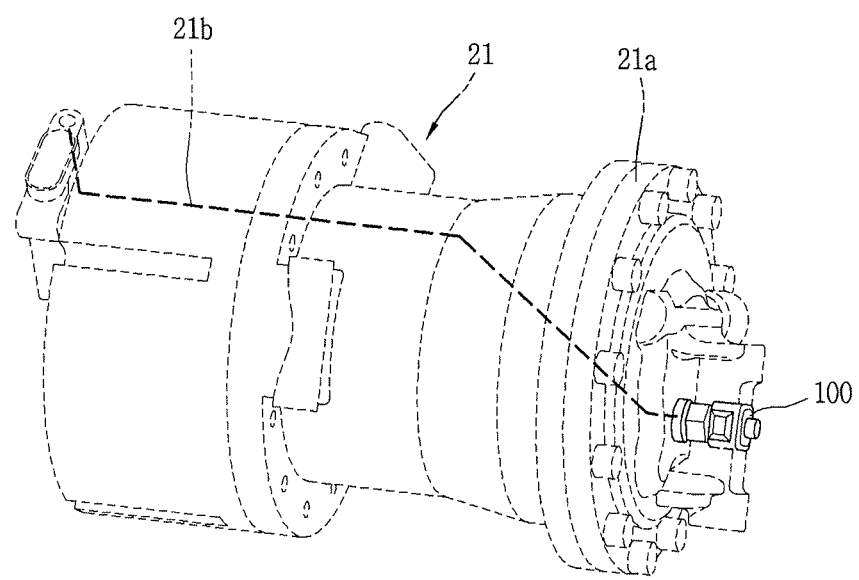
FIG. 2 illustrates a compressor with a piston value of a safety device according to FIG. 1.

As illustrated in FIG. 2, the PRV 100 according to the present embodiment can be coupled through one side of the compressor casing, namely, a rear cover 21a forming the high pressure portion. The PRV 100 can be configured to switch or be activated according to a change of internal pressure of the compressor 21, but also configured to be electrically connected to the ACU 12 and linked with the ACU 12. When linked with the ACU 12, the PRV 100 can be connected to the ACU 12 to prevent harmful refrigerant from being introduced into the interior of the vehicle when an accident occurs, in addition to removing part of the refrigerant in an excessive compression condition, in order to allow the refrigeration cycle to maintain a proper pressure. As a result, the ACU 12 can transfer an operation signal to the PRV 100 prior to, at the same time or immediately subsequent to transferring an airbag operation signal to the inflator, and when the PRV 100 receives a signal from the ACU 12 to be opened, the refrigerant in the high pressure portion can be discharged to the outside of the vehicle. Reference numeral 21b is a power connecting line.

The PRV according to the present embodiment can be implemented in various forms. For example, the PRV can be configured to remove a type of safety pin mechanically connected to the motor to open the valve when an accident occurs.

Figure 3:
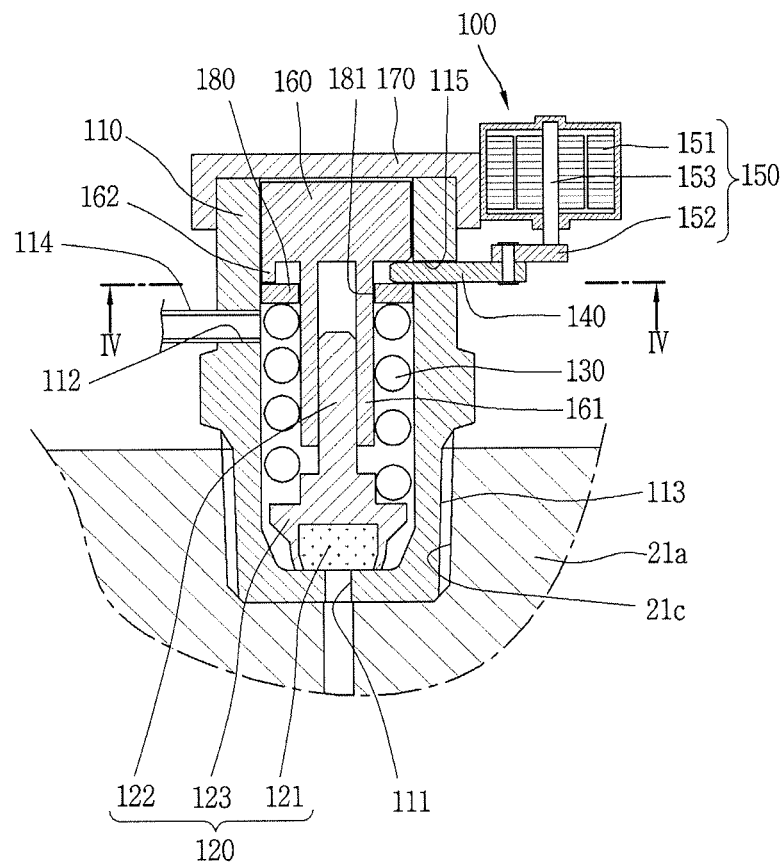
FIG. 3 is a longitudinal cross-sectional view illustrating a pressure relief valve (PRV) according to an embodiment.
Figure 4:
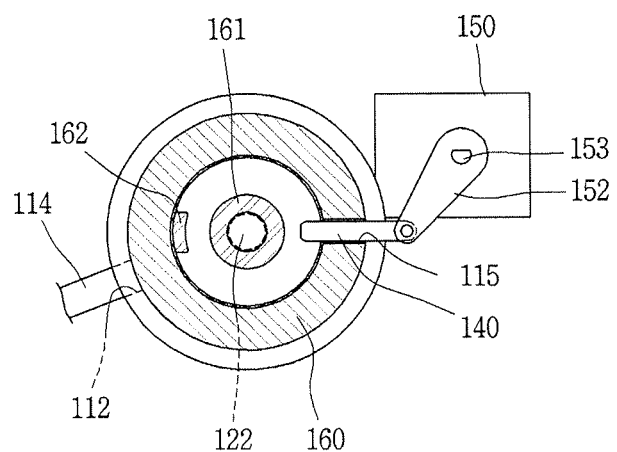
FIG. 4 is a cross-sectional view taken along line "IV-IV" in FIG. 3.
Figure 5:
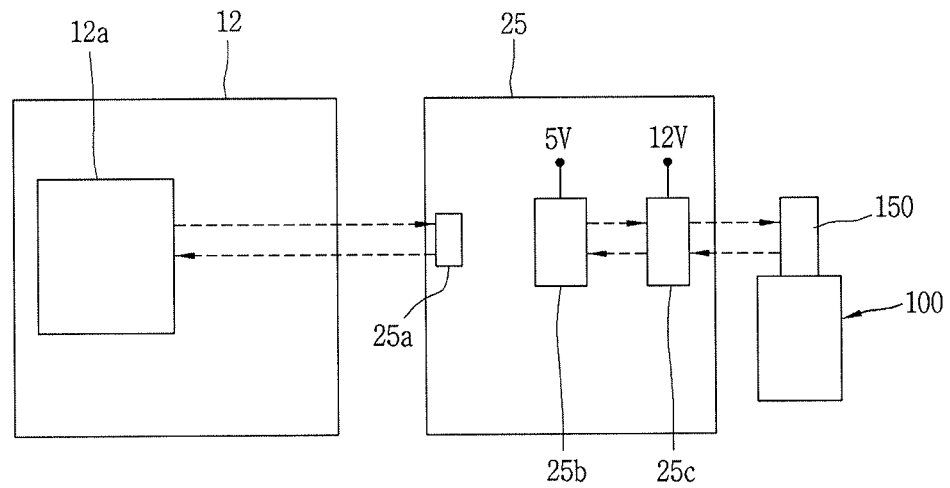
FIGS. 5 and 6 are schematic views illustrating a configuration for operating a PRV according to an embodiment.
Figure 6:
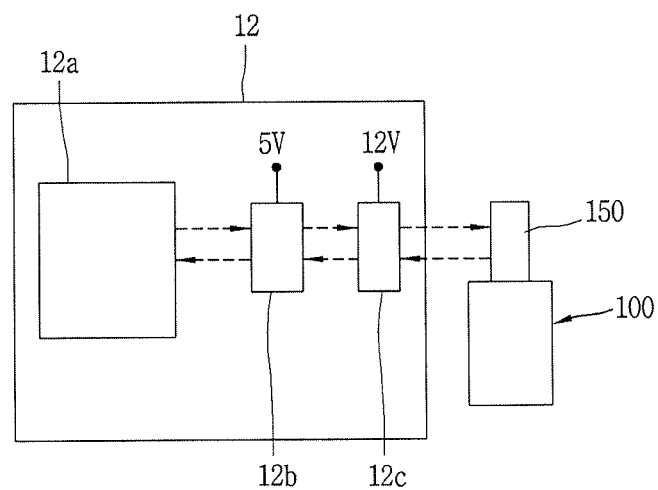

FIG. 3 is a longitudinal cross-sectional view illustrating the PRV according to the present embodiment, and FIG. 4 is a cross-sectional view taken along line "IV-IV" in FIG. 3, and FIGS. 5 and 6 are schematic views illustrating configurations for operating the PRV according to embodiments.

As illustrated in FIG. 3, the PRV 100 according to the present embodiment can include a valve housing 110 having an inlet 111 and an outlet 112, a piston valve 120 provided within the valve housing 110 to selectively switch open the inlet 111, a valve spring 130 provided at a backpressure side of the piston valve 120 to limit the valve 120 from being opened, a spacer 140 passing through the valve housing 110 to adjust an elastic force of the valve spring 130, and a control unit 150 provided at one side of the valve housing 110 to operate the spacer 140.

A fastening portion 113 for fastening a screw to the compressor 21 can be formed on an outer circumferential surface at an end of the valve housing 110. Also, the valve housing 110 can be bonding-coupled to the compressor 21, but in this the screw fastener allows the PRV to be easily replaced at the same time when replacing the compressor 21 or part of the compressor. Accordingly, as illustrated in FIGS. 2 and 3, it a fastening groove 21c can be formed on the rear cover 21a of the compressor 21 to screw-couple an end of the PRV 100 to the fastening groove.

Furthermore, the inlet 111 of the valve housing 110 can be formed at the center of the fastening portion 113. Also, the valve housing 110 can be communicated with an inner space of the compressor 21 at any location.

In addition, the outlet 112 of the valve housing 110 can be formed outside of the compressor 21, and a discharge guide pipe 114 for guiding refrigerant bypassed through the inlet 111 of the valve housing 110 to the outside of the vehicle can be connected to the outlet 112. The discharge guide pipe 114 can open toward the bottom surface of the vehicle (e.g., towards the ground or under the vehicle), in order to effectively block refrigerant from being introduced into the interior of the vehicle.

Furthermore, a spacer hole 115 can be formed in a penetrating manner at a middle height of the valve housing 110 to slidably insert the spacer 140. The spacer hole 115 can be set larger than a cross-sectional area of the spacer 140 to avoid getting caught when releasing the spacer 140.

Also, a valve guide 160 for guiding the movement of the piston valve 120 can be provided within the valve housing 110. The valve guide 160 can be inserted into an upper end of the valve housing 110 and closely fixed to a valve cover 170 covering an upper end of the valve housing 110.

A guide portion 161 protruded toward the piston valve 120 is formed on a bottom surface of the valve guide 160. The guide portion 161 can be formed in a cylindrical shape to be slidably couple with a sliding portion 122 of the piston valve 120, which will be described later.

A valve portion 121 is formed at one end of the piston valve 120 to switch open the inlet 111 of the valve housing 110, and the sliding portion 122 slidably coupled to the valve guide 160 to guide a linear movement can be formed on a rear side of the valve portion 121. Furthermore, a flange portion 123 can be formed between the valve portion 121 and the sliding portion 122 to support one end of the valve spring 130.

The valve spring 130 is made of a compression coil spring and inserted into the sliding portion 122 of the piston valve 120, and one end of the valve spring 130 can be supported by the flange portion 123 of the piston valve 120, whereas the other end thereof is supported by a spring support plate 180, which will be described later.

The spring support plate 180 is located between the spacer 140 and the valve spring 130 to prevent the valve spring 130 from directly contacting the spacer 140. The spring support plate 180 can be formed in a circular plate shape to form a guide hole 181 to allow the guide portion 161 of the valve guide 160 to pass through the center thereof.

Furthermore, one side of the spring support plate 180 can be closely adhered to the spacer 140 as illustrated in FIG. 3, and the other side thereof can be closely adhered to the a support 162 protruded from a bottom surface of the valve guide 160, but according to circumstances, the spring support plate 180 can be supported solely by the spacer 140 when the support 162 of the valve guide 160 is excluded. In a situation where the spring support plate 180 is supported by the support 162 of the valve guide 160 and the spacer 140, the spring support plate 180 is operated while inclining or tilting the spring support plate 180 when the PRV is operated, but the piston valve 120 is inclined or movable by a gap between the guide portion 161 of the valve guide 160 and the sliding portion 122 of the piston valve 120 to open the inlet 111 of the valve housing 110.

The spacer 140 performs the role of a type of safety pin or release pin, and is formed in a rectangular shape and slidably inserted and coupled to the spacer hole 115 of the valve housing 110. One end of the spacer 140 can be located between the valve guide 160 and the spring support plate 180, and the other end of the spacer 140 can be coupled to a connection portion 152 of the control unit 150, which will be described later.

Furthermore, the spacer 140 can be disposed only at one side as illustrated in FIG. 3, but a plurality of spacers 140 can be disposed at predetermined intervals along a circumferential direction according to circumstances. Furthermore, when using a plurality of spacers 140, the control unit 150 can be independently provided at each spacer 140, but all of the control units can be connected to one control unit 150 using the connection portion 152 which will be described later.

Also, the control unit 150 can include a motor unit 151 operated by external power, and a connection portion 152 coupled to a rotor of the motor unit 151 to operate the spacer 140 of the PRV. The motor unit 151 can be a type of step motor, which is configured to receive power from the compressor controller or ACU 12 to reciprocally rotate within a predetermined angle. For example, the motor unit 151 of the PRV 100 can be configured to receive an electrical signal through a photocoupler 25b or optocoupler and a current amplifier circuit 25c of the compressor controller 25 performing CAN (Controller Area Network) communication through the ACU 12 and a CAN transceiver 25a as illustrated in FIG. 5, or directly connected for receiving an electrical signal through an airbag explosion sensing circuit 12a, a photocoupler 12b and a current amplifier circuit 12c of the ACU 12 as illustrated in FIG. 6.

The connection portion 152 can be formed with one cam link as illustrated in FIGS. 3 and 4. However, it may be also formed in a reel-like shape. Also, the motor unit 151 and connection portion 152 may be formed in a rack and pinion configuration. Among the drawings, reference numeral 153 is a rotating shaft.

The foregoing safety device for vehicle according to the present embodiment can have the following operational effects. For instance, when a collision is sensed by the collision sensor 11 provided at a front side or lateral surface of the vehicle, the sensed signal is transferred to the ACU 12 while at the same expanding the airbag 13, and the ACU 12 transfers an open signal to the control unit 150 of the PRV 100 through the compressor controller 25 as illustrated in FIG. 5 or in a direct connection manner as illustrated in FIG. 6.

Figure 7A:
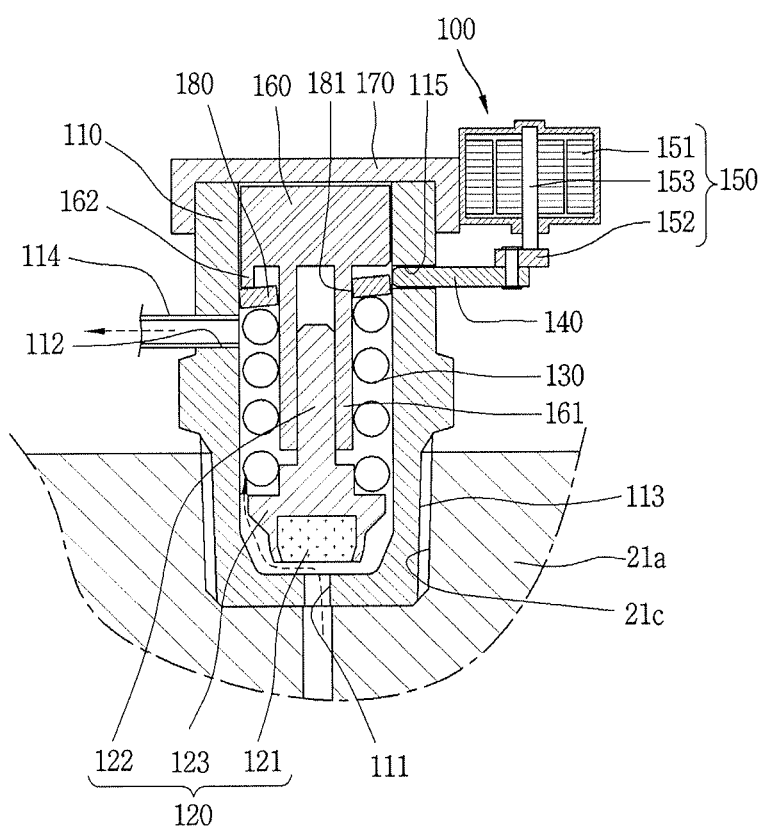
Figure 7B:
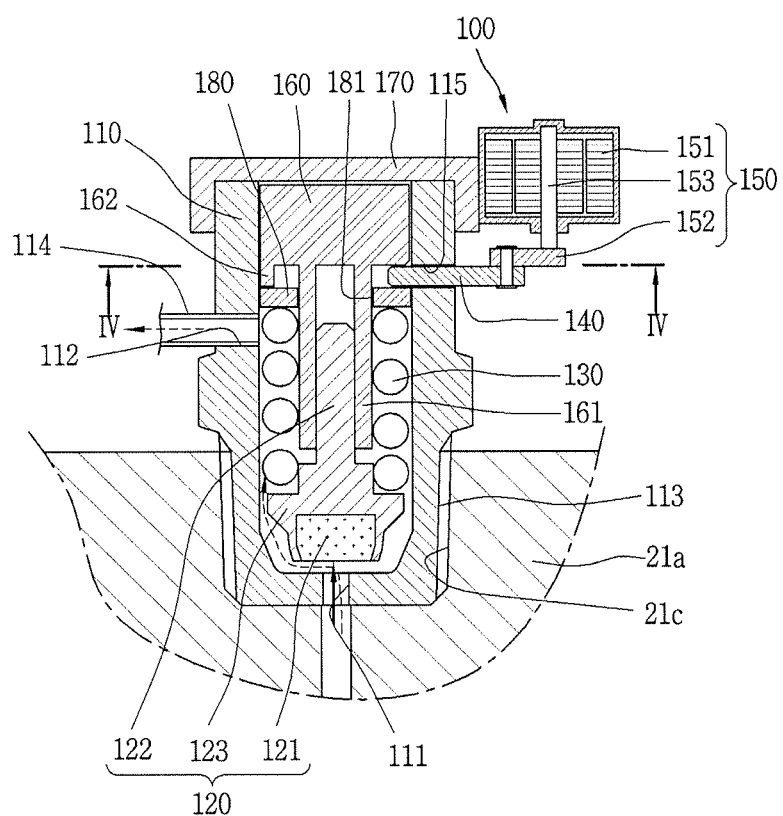

Then, the motor unit 151 of the control unit 150 that has received the signal is switched from a valve closed state as illustrated in FIG. 3 to a valve open state as illustrated in FIG. 7A. In other words, when the motor unit 151 is operated by a signal received from the ACU 12, the connection portion 152 rotates in a counter-clockwise direction of the drawing as illustrated in a dotted line in FIG. 4. Here, the connection portion 152 that is a cam link rotates to move the spacer 140 to the right in drawing while at the same dragging the spacer 140, thereby moving the spacer 140 to a withdrawn position as illustrated in FIG. 7A.

Then, a space capable of moving upward by a distance of the spacer 140 from which the spring support plate 180 that has supported a backpressure side of the valve spring 130 is removed can be secured. Here, the piston valve 120 can be pushed by an internal pressure of the compressor to move upward while reducing an elasticity of the valve spring 130 or creating a clearance.

Then, refrigerant is discharged out of the compressor through the PRV 100 from an inner space of the compressor 21 as the inlet 111 and the outlet 112 provided on the valve housing 110 of the PRV 100 are place in communication with each other and a path is opened between the inlet and the outlet. Here, as one end of the discharge guide pipe 114 is connected to the outlet 112 of the valve housing 110 and the other end of the discharge guide pipe 114 is extended and formed toward the bottom of the vehicle, carbon dioxide refrigerant discharged from the compressor 21 is discharged to a side far away from the interior of the vehicle.

Further, when excessive compression occurs in the compressor 21 of the refrigeration cycle device 20 due to other reasons even though the vehicle continues to drive normally, the PRV 100 is opened to prevent excessive compression regardless of whether any signal is received. In other words, when an internal pressure of the compressor increases greater than or equal to a predetermined pressure (typically, 170 bar), a force due to the internal pressure of the compressor 21 can push the piston valve 120 and exceed an elasticity of the valve spring 130 to open the valve and communicate the inlet 111 and outlet 112 of the valve housing 110 even though the spacer 140 is not pulled out as illustrated in FIG. 7C, thereby solving a excessive compression scenario.

Another embodiment of the PRV according to the present disclosure will be described as follows. For example, according to the foregoing embodiment, the control unit can include a motor unit and a connection portion, in which the motor unit operates the connection portion according to a signal transferred from the ACU to directly move the spacer, but according to the present embodiment, the control unit can restrict or release the spacer to allow the spacer to move by an additional driving source in order to open even faster.

Figure 8:
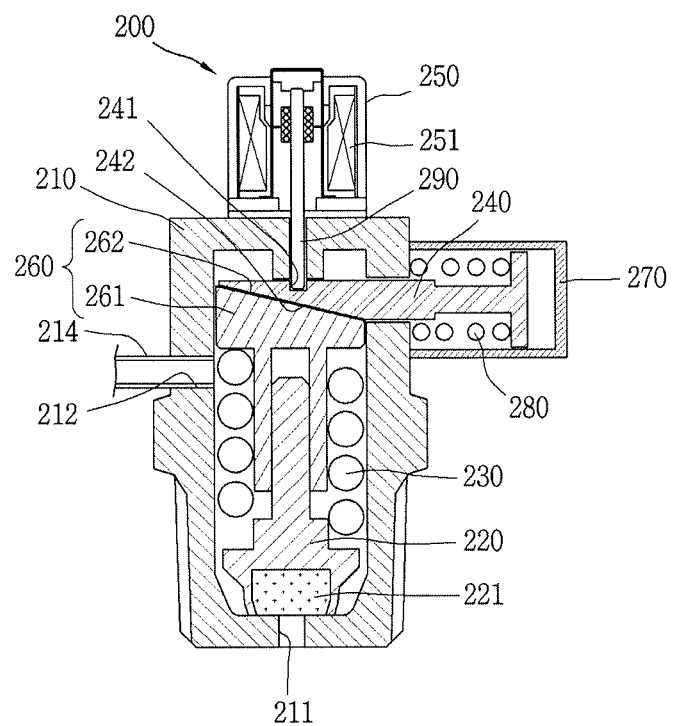
FIG. 8 is a longitudinal cross-sectional view illustrating another embodiment of a PRV according to an embodiment.
Figure 9A:
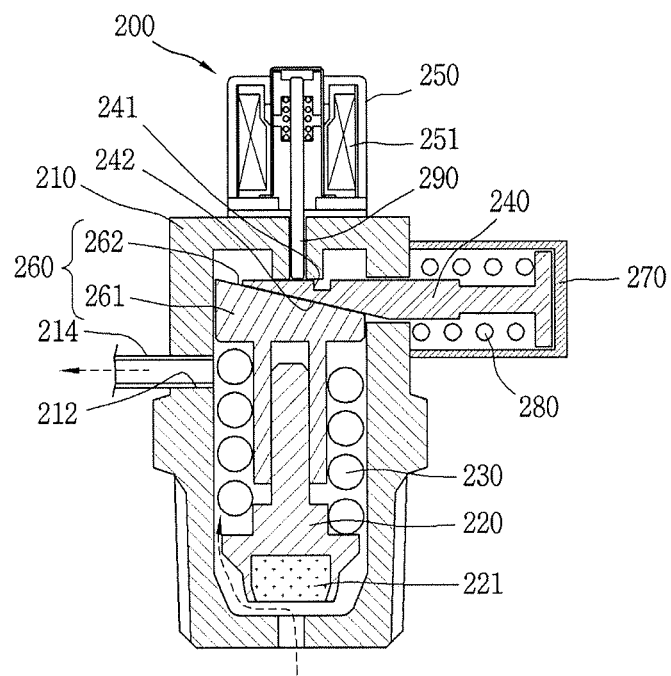
Figure 9B:
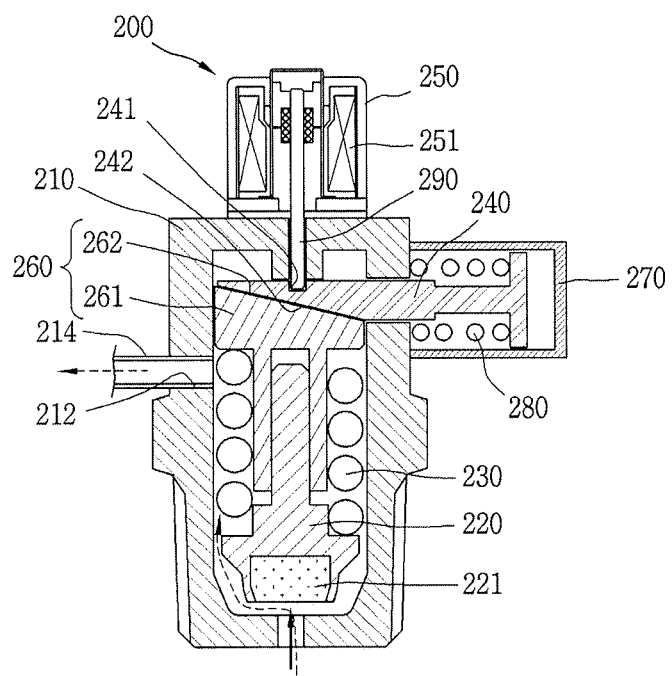

FIG. 8 is a longitudinal cross-sectional view illustrating another embodiment of a PRV. FIGS. 9A and 9B are longitudinal cross-sectional views illustrating the operations of a PRV according to FIG. 8.

As illustrated in FIG. 8, a PRV 200 can include a valve housing 210, a piston valve 220, a valve spring 230, a spacer 240, a control unit 250 and a valve guide 260, similarly to the foregoing embodiment. However, according to the present embodiment, a spacer housing 270 can be coupled to one side of the valve housing 210, and a return spring 280 for pushing the spacer 240 in a valve in the open direction can be provided within the spacer housing 270.

Furthermore, the control unit 250 can be provided with a stopper 290 on a mover instead of the connection portion of the foregoing embodiment, and configured to restrict or release the spacer 240 according to whether or not power is applied. A restricting groove 241 can be formed on an upper surface of the spacer 240 to insert the stopper 290. The stopper 290 can be integrally extended and formed on the mover or additionally fabricated and assembled later.

Furthermore, a sliding portion 261 that is slidably coupled to the spacer 240 is provided at an upper end of the valve guide 260, and a surface corresponding to the spacer 240 is formed on the sliding portion 261 to have an inclined surface 262 inclined in a direction opposite thereto. As a result, the valve guide 260 can be pushed by the spacer 240 according to the movement direction of the spacer 240 to pressurize the valve spring 230 in a closed direction to close the piston valve 220 or be moved in an open direction to open the piston valve 220.

As illustrated in FIG. 9A, when the motor unit 251 of the control unit 250 receives a signal from the ACU 12 to allow the stopper 290 coupled to the mover to move in an upward direction, the stopper 290 is released from the restricting groove 241 of the spacer 240 (e.g., the stopper 290 is pulled out). Here, the spacer 240 is pushed to the right side of the drawing by the return spring 280.

Then, the inclined surface 262 of the valve guide 260 adjacent to the inclined surface 242 of the spacer 240 moves in an opposite direction to the inclined surface 242 of the spacer 240, thereby raising the valve guide 260 upward. Here, an elasticity of the valve spring 230 decreases as a gap between a valve portion 221 of the piston valve 220 and the valve guide 260 increases.

Then, the piston valve 220 is pushed out by a force due to an internal pressure of the compressor 21 to allow the inlet 211 and the outlet 212 of the valve housing 210 to communicate with each other, thus opening the PRV. Then, carbon dioxide within the compressor can be discharged outside of the vehicle along the valve housing 210 and discharge guide pipe 214, thereby preventing refrigerant from being introduced into the interior of the vehicle.

Further, as illustrated in FIG. 9B, when an internal pressure of the compressor is greater than or equal to a predetermined pressure (typically, 170 bar) even when the spacer 240 is restricted by the control unit 250, a force due to the internal pressure of the compressor can exceed an elastic force of the valve spring 230 to push up the piston valve 220, thereby allowing the inlet 211 and the outlet 212 of the valve housing 210 to communicate with each other and open the PRV. In this instance, the PRV prevents excessive pressure in the compressor without receiving a signal from the ACU as illustrated in the foregoing embodiment. The operational effects thereof are similar to those of the foregoing embodiment, and thus the detailed description thereof will be omitted.

Further, another embodiment of the operation method of the PRV according to the present disclosure will be described as follows. For example, according to the foregoing embodiment, when the collision sensor transfers a collision signal to the ACU, the ACU transfers an operation signal (open signal) to the PRV to operate the PRV to discharge refrigerant within the compressor to the outside of the vehicle, but according to the present embodiment, the collision sensor is configured to transfer the sensed signal directly to the PRV.

Figure 10:
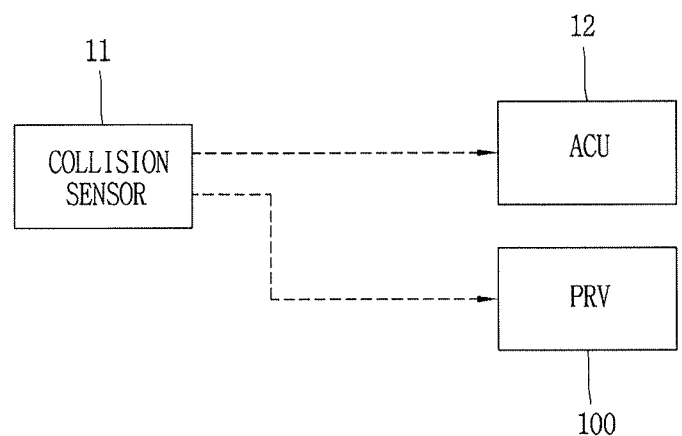
Figure 11:
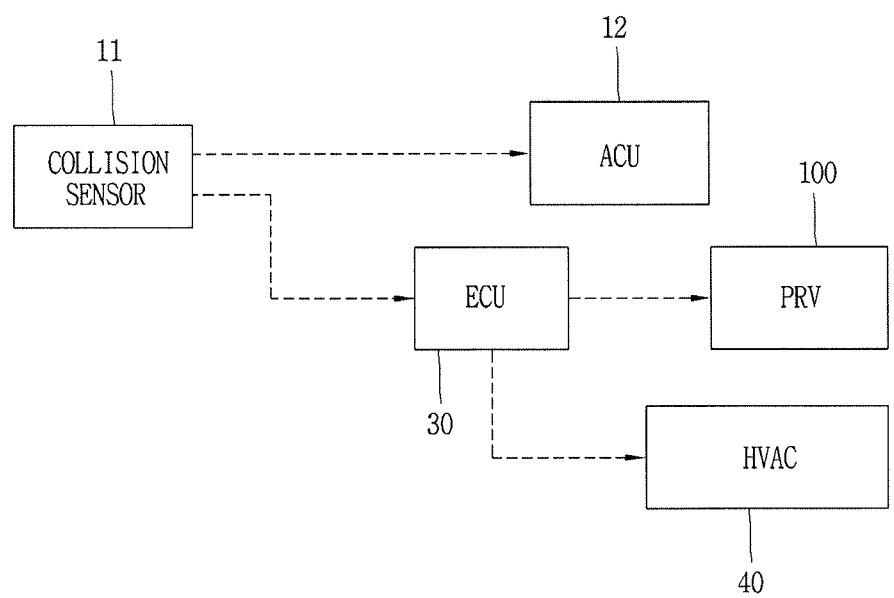
Figure 12:
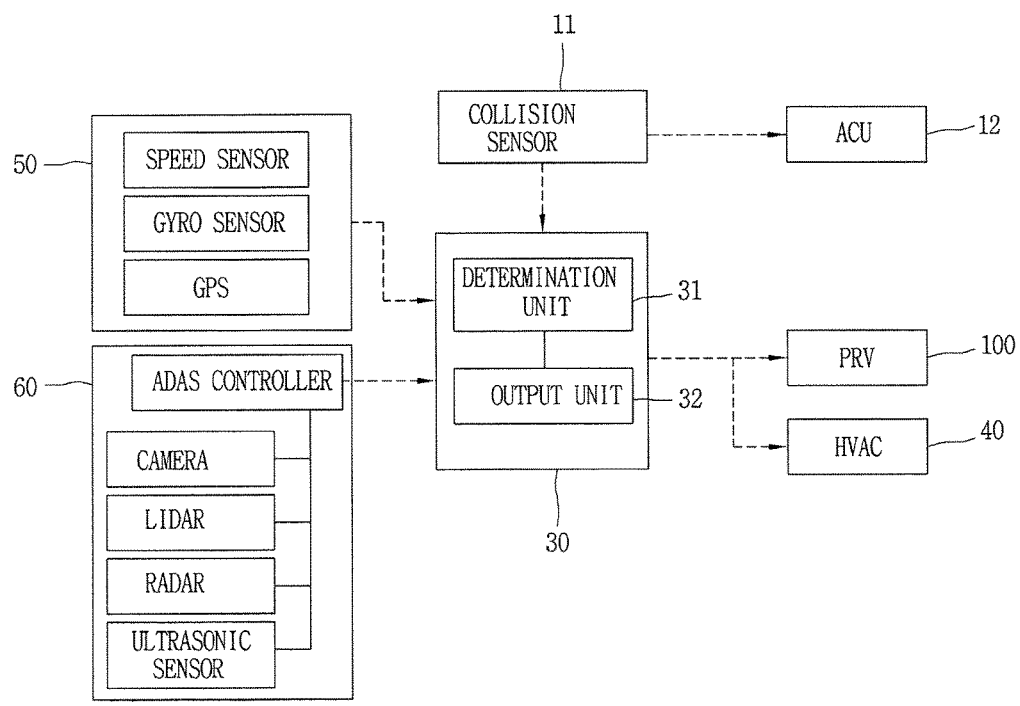

FIGS. 10 through 12 are block diagrams illustrating operation examples of a PRV according to the present embodiment. FIGS. 10 and 11 are views illustrating operation examples using a collision sensor, and FIG. 12 is an operation example using an advanced driver assistance system (ADAS). FIGS. 13A through 13F are block diagrams illustrating explaining the operational states of a PRV and a HVAC for various situations during the driving of the vehicle.

According to an embodiment, with reference to FIG. 10, the collision sensor 11 can directly transfer the sensed signal to the ACU 12 and PRV 100, respectively, when a collision is sensed on the collision sensor 11. Compared to transferring a collision signal to the PRV 100 through the ACU 12 as illustrated in the foregoing embodiment, when the PRV 100 receives a signal directly from the collision sensor 11, the PRV 100 may be more quickly operated (e.g., harmful refrigerant can be discharged sooner).

Furthermore, according to an embodiment of FIG. 11, when a collision is sensed by the collision sensor 11, the sensed signal is transferred to the ACU 12 and the electronic control unit (ECU) 30 within the vehicle, respectively to operate an airbag in the ACU 12 as well as transfer signals to the PRV 100 and heating, ventilation, and air conditioning (HVAC) 40, respectively, in the ECU 30. As a result, the HVAC 40 can open or close an outdoor air inlet and an indoor air inlet, respectively, while at the same operating the PRV 100, thereby effectively blocking refrigerant from being introduced into the interior of the vehicle even when part of the carbon dioxide refrigerant is leaked prior to the operation of the PRV 100.

Furthermore, according to an embodiment of FIG. 12, the electronic control unit 30 within the vehicle can estimate or detect various situations such as whether or not there is a collision, or whether or not there is an overturn or plunge of the vehicle, or an estimated time-to-collision, or whether or not the PRV is activated (opens), or the like, using a collision sensor or various sensors 50 (speed sensor, acceleration sensor, GPS, etc.) and ADAS related components 60 (camera, lidar, radar, ultrasonic sensor, etc.) provided in the vehicle, thereby determining whether or not to operate (open) the PRV 100 and HVAC 40.

Figure 13A:
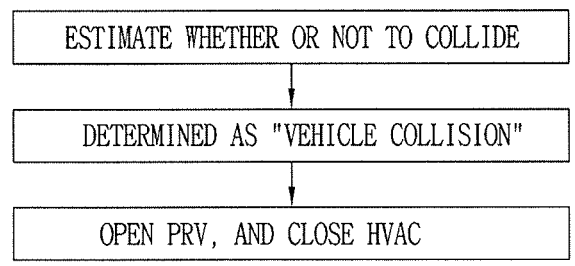
FIGS. 13A through 13F are block diagrams illustrating operational states of a PRV and a HVAC for various situations during the driving of the vehicle according to embodiments.

Thus, according to the present embodiment, a determination unit 31 for estimating vehicle situations in advance may be provided therein, and an output unit 32 for determining and controlling whether or not to operate (open) the PRV 100 and HVAC 40 according to the estimation of the determination unit 31 may be provided therein. For example, as illustrated in FIG. 13A, signals transferred from the sensors 50, 60 such as the camera or the like can be compared by the determination unit 31 to estimates whether or not the vehicle is in a collision or is about to be in a collision, and when the estimation result of the determination unit 31 is determined as a "vehicle collision" and transferred to the output unit 32, the ECU 30 can control the PRV 100 to be operated through the output unit 32 while at the same controlling an external air inlet and an internal air inlet of the HVAC 40 or the like to be closed, thereby preventing hazardous materials from being introduced into the vehicle in advance before any damage to the compressor occurs during a collision. Also, the collision sensor 11 can be electrically connected to the PRV 100 to control whether or not to operate the airbag.

Figure 13B:
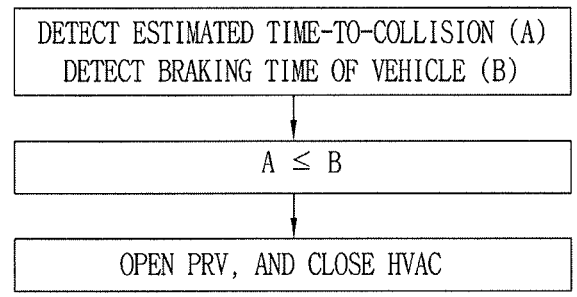

Further, the present embodiment can compare an estimated time-to-collision of the vehicle with a manipulation time of the vehicle to operate (open) the PRV 100 and HVAC 40 in advance. For example, as illustrated in FIG. 13B, a distance between an obstacle and the vehicle (equipped with the PRV) is measured using the sensors 50, 60 such as the speed sensor, GPS, camera, or the like. The determination unit 31 compares a braking distance of the vehicle based on the measurement value, and estimates that the vehicle will collide with the obstacle when the distance (A) to the obstacle, which is a measurement value, is less than or equal to the braking distance (B) of the vehicle. Then, the ECU 30 can control the PRV 100 to be activated through the output unit 32 to discharge refrigerant out of the vehicle or control the external air inlet and internal air inlet of the HVAC 40 or the like to be closed to block refrigerant that is a hazardous gas from being introduced into the vehicle.

Furthermore, the safety device can determine whether or not collision is avoidable with the maximum steering manipulation, and when determined that collision is unavoidable even with the maximum steering manipulation, as described above, the ECU 30 can control the PRV 100 to be operated through the output unit 32 to discharge refrigerant out of the vehicle and/or control the external air inlet and internal air inlet of the HVAC 40 or the like to be closed to block refrigerant that is a hazardous gas from being introduced into the vehicle.

Figure 13C:
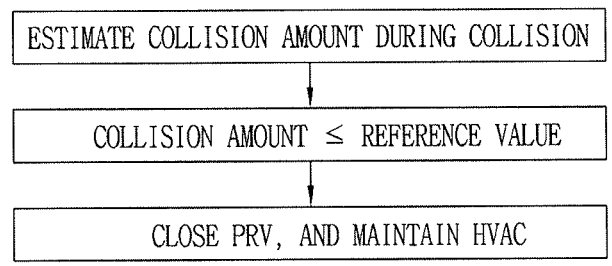

Further, the present embodiment can estimate or detect a collision amount or collision degree of the vehicle to selectively operate (open) the PRV 100 and HVAC 40 according to a size or severity of the collision amount. For example, as illustrated in FIG. 13C, the determination unit 31 of the ECU 30 estimates and calculates a collision amount when the vehicle collides or is about to collide with the obstacle using signals transferred from the sensors 50, 60 such as the speed sensor, camera, or the like. Then, the determination unit 31 can compare the calculated collision amount with the stored reference value, and when the collision amount is greater than or equal to the reference value, the ECU 30 can control the PRV 100 to be operated through the output unit 32 to discharge refrigerant out of the vehicle and/or control the external air inlet and internal air inlet of the HVAC 40 or the like to be closed to block hazardous refrigerant from being introduced into the vehicle.

However, when the collision amount is less than or equal to the reference value, the ECU 30 can control the PRV 100 not to be operated through the output unit 32 (e.g., PRV remains closed) while at the same allowing the external air inlet and internal air inlet of the HVAC 40 or the like to maintain a current state. In this instance, the calculation of the collision amount can be performed based on the speed of the vehicle, a property of the obstacle, a rear collision or side-rear collision, or the like.

Figure 13D:
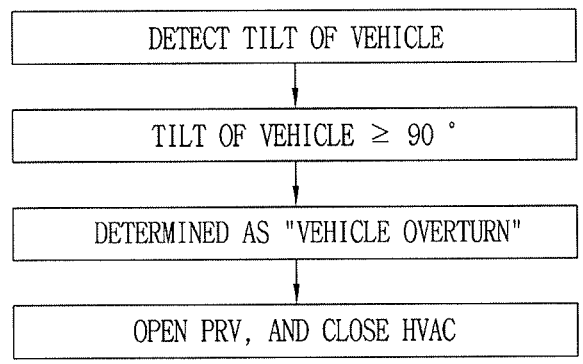

Further, the safety device can estimate an overturn or plunge state of the vehicle to operate (open) the PRV 100 and HVAC 40 in advance of a collision. For example, as illustrated in FIG. 13D, the determination unit 31 of the ECU 30 detects a tilt of the vehicle, that is, the extent of vehicle is tilted with respect to a horizontal surface transferred from the sensors 50, 60 such as the gyro sensor, camera, or the like in real time, and estimates the situations as a "vehicle overturn" at the moment when the vehicle is turned over above 90 degrees with respect to a horizontal surface as a result of the detection. Then, the ECU 30 can control the PRV 100 to be operated through the output unit 32 to discharge refrigerant out of the vehicle and/or control the external air inlet and internal air inlet of the HVAC 40 or the like to be closed to block hazardous refrigerant from being introduced into the interior of the vehicle.

Figure 13E:
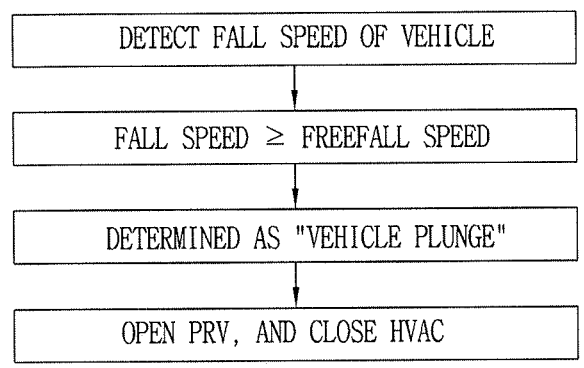
Figure 13F:
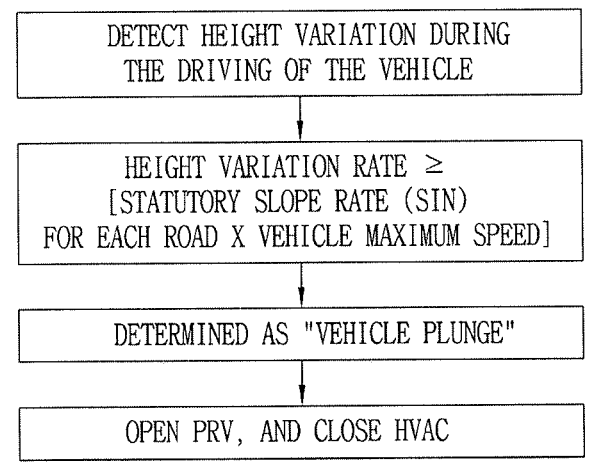

Furthermore, as illustrated in FIG. 13E, the determination unit 31 can detect a fall speed of the vehicle in real time using the sensors 50, 60 such as the gyro sensor, camera, or the like, and determines it as a "vehicle plunge" state when the fall speed of the vehicle is close to a freefall speed as a result of the detection, and the ECU 30 can control the PRV 100 to be operated through the output unit 32 to discharge refrigerant out of the vehicle and/or control the external air inlet and internal air inlet of the HVAC 40 or the like to be closed to block hazardous refrigerant gas from leaking into the vehicle Furthermore, as illustrated in FIG. 13F, the determination unit 31 can detect a height variation rate during the driving of the vehicle using the sensors 50, 60 such as the gyro sensor, camera, or the like, and determine a "vehicle plunge" state when the height variation rate during the driving of the vehicle exceeds or equals a statutory slope rate (sin) for each road×vehicle maximum speed as a result of the detection, and the ECU 30 can control the PRV 100 to be activated through the output unit 32 to discharge refrigerant out of and away from the vehicle and/or control the external air inlet and internal air inlet of the HVAC 40 or the like to be closed to block refrigerant that is a hazardous gas from being introduced into the vehicle Consequently, it is possible to operate (open) the PRV in response to a collision or imminent collision of the vehicle as well as other accidental circumstances to discharge carbon dioxide refrigerant outside and away from the vehicle while at the same controlling the switching of the outdoor air and indoor air inlets of the HVAC, thereby further enhancing the stability and safety of the vehicle.

What is claimed is:

1. A safety device for a vehicle, the safety device comprising:
   an impulse sensor configured to sense an impact to the vehicle and generate an impulse signal based on the impact;
   a compressor configured to compress refrigerant for a refrigeration cycle of the vehicle, having a compressor casing; and
   a safety valve coupled to the compressor casing and configured to:
   receive the impulse signal from the impulse sensor, and
   in response to the impulse signal exceeding a predetermined value, open the safety valve to place an inner space of the compressor casing in communication with an outside of the compressor for discharging the refrigerant outside the vehicle,
   wherein the safety valve comprises:
   a valve housing having an inlet and an outlet, the valve housing being in communication with the inner space of the compressor casing;
   a piston valve within the valve housing to selectively place the inlet and the outlet in communication with each other;
   a valve spring provided at a backpressure side of the piston valve and configured to limit the piston valve from being opened;
   a spacer inserted through the valve housing and configured to adjust an elastic force of the valve spring; and
   a spacer controller provided at one side of the valve housing and configured to control movement of the spacer,
   wherein the valve housing further comprises a spacer hole which passes through one side of the valve housing, and
   wherein the spacer is partially inserted into the spacer hole and partially protruded from the spacer hole and the spacer is configured to move through the spacer hole.

2. The safety device of claim 1, wherein the safety valve is electrically connected to an airbag controller or an electronic controller, and
   wherein the safety value includes a motor for opening the safety valve based on a signal received from the airbag controller or the electronic controller.

3. The safety device of claim 2, wherein the electronic controller is configured to determine a collision state of the vehicle before, during or after a collision occurs based on one or more signals received from one or more sensors within the vehicle, and
   wherein the electronic controller is further configured to control a heating, ventilation, and air conditioning controller in the vehicle based on the collision state.

4. The safety device of claim 1, wherein the safety valve is configured to discharge the refrigerant inside the compressor to the outside of the compressor via the outlet, and
   wherein the outlet is connected to a discharge guide pipe configured to guide the refrigerant from the compressor to an outside of the vehicle.

5. The safety device of claim 1, wherein the safety valve is configured to open in response to an internal pressure of the compressor exceeding a predetermined pressure.

6. The safety device of claim 1, wherein the spacer controller comprises:
   a motor configured to receive power to operate; and
   a connection portion coupled between the motor and the spacer and configured to transfer a driving force of the motor to the spacer to move the spacer.

7. The safety device of claim 6, wherein a valve guide configured to guide the movement of the piston valve is further provided within the valve housing, and
   a guide portion into which a sliding portion of the piston valve is slidably inserted is formed on the valve guide in a switching direction of the piston valve.

8. The safety device of claim 1, wherein the spacer controller comprises:
   a motor configured to receive power to operate;
   a stopper provided in the motor and configured to restrict or release the movement of the spacer while being moved by the motor; and
   a return spring configured to support the stopper and move the stopper when the stopper is released from the spacer.

9. The safety device of claim 8, wherein a valve guide configured to guide the movement of the piston valve is further provided within the valve housing,
   wherein the valve guide is slidably coupled to the spacer, and
   wherein a surface on which the valve guide and the spacer are brought into contact is formed in an inclined manner to move the spacer and the valve guide in an orthogonal direction.

10. A safety device for a vehicle, the safety device comprising:
    a refrigeration cycle controller configured to control a refrigeration cycle for heating or cooling a passenger compartment of the vehicle;
    an electronic controller provided configured to control functions of the vehicle; and
    a refrigerant discharge unit electrically connected to the electronic controller to selectively discharge refrigerant of the refrigeration cycle to an outside of the vehicle,
    wherein the refrigerant discharge unit comprises:

a valve housing having an inlet and an outlet;

a piston valve within the valve housing to selectively place the inlet and the outlet in communication with each other;

a valve spring provided at a backpressure side of the piston valve and configured to limit the piston valve from being opened;

a spacer inserted through the valve housing and configured to adjust an elastic force of the valve spring; and a spacer controller provided at one side of the valve housing configured to control movement of the spacer, wherein the valve housing further comprises a spacer hole which passes through one side of the valve housing, and wherein the spacer is partially inserted into the spacer hole and partially protruded from the spacer hole and the spacer is configured to move through the spacer hole.

11. The safety device of claim 10, wherein the electronic controller is configured to determine an impact the vehicle will receive, and transmit a signal to the refrigerant discharge unit to discharge the refrigerant outside the vehicle or close an air path of the refrigeration cycle unit for preventing the refrigerant from entering an interior of the vehicle when the value is greater than or equal to a predetermined range.

12. The safety device of claim 10, wherein the electronic controller is configured to determine an estimated time-to-collision and a braking time of the vehicle, and transmit a signal to the refrigerant discharge unit to discharge the refrigerant outside the vehicle or close an air path of the refrigeration cycle unit for preventing the refrigerant from entering an interior of the vehicle based on the estimated time-to-collision and the braking time of the vehicle.

13. The safety device of claim 12, wherein the electronic controller is configured to compare the estimated time-to-collision and the braking time of the vehicle, and transmit a signal to the refrigerant discharge unit to discharge the refrigerant outside the vehicle or close an air path of the refrigeration cycle unit for preventing the refrigerant from entering an interior of the vehicle when the estimated time-to-collision of the vehicle is less than or equal to the braking time of the vehicle.

14. The safety device of claim 10, wherein the electronic controller is configured to determine a collision of the vehicle, and transmit a signal to the refrigerant discharge unit to prevent discharging the refrigerant outside the vehicle when the collision is less than or equal to a stored value.

15. The safety device of claim 10, wherein the electronic controller is configured to detect a tilt of the vehicle defined by an extent of the vehicle being tilted with respect to a horizontal surface, and transmit a signal to the refrigerant discharge unit to discharge the refrigerant outside the vehicle or close an air path of the refrigeration cycle unit for preventing the refrigerant from entering an interior of the vehicle based on the tilt of the vehicle with respect to the horizontal surface.

16. The safety device of claim 10, wherein the electronic controller is configured to detect a speed of the vehicle, and transmit a signal to the refrigerant discharge unit to discharge the refrigerant outside the vehicle or close an air path of the refrigeration cycle unit for preventing the refrigerant from entering an interior of the vehicle based on the speed of the vehicle.

17. The safety device of claim 10, wherein the electronic controller is configured to detect a variation rate while the vehicle is being driven, and transmit a signal to the refrigerant discharge unit to discharge the refrigerant outside the vehicle or close an air path of the refrigeration cycle unit for preventing the refrigerant from entering an interior of the vehicle based on the variation rate while the vehicle is being driven.

18. The safety device of claim 17, wherein the electronic controller is configured to transmit a signal to the refrigerant discharge unit to discharge the refrigerant outside the vehicle or close an air path of the refrigeration cycle unit for preventing the refrigerant from entering an interior of the vehicle when a variation rate of the vehicle is greater than or equal to a statutory slope rate (sin) for each road×vehicle speed.

19. The safety device of claim 9, wherein a restricting groove is formed in the spacer, wherein the stopper is configured to be inserted into or ejected from the restricting groove by the motor, and wherein the stopper restricts the spacer when the stopper is inserted into the restricting groove.

20. The safety device of claim 10, wherein a spring support plate is provided within the valve housing and located between the spacer and the valve spring, wherein a support is protruded from of a bottom surface of the valve guide to support the one side of the spring support plate with the spacer, and wherein the spacer is configured to restrict the movement of the valve housing when the spacer is partially inserted into the spacer hole.

* * * * *